(12) United States Patent
Hodnefjell

(10) Patent No.: US 9,419,373 B2
(45) Date of Patent: Aug. 16, 2016

(54) DEVICE FOR INDUCTIVE TRANSMISSION OF ELECTRICAL ENERGY

(71) Applicant: Blue Logic AS, Sandnes (NO)

(72) Inventor: Lars Gunnar Hodnefjell, Mosteroy (NO)

(73) Assignee: Blue Logic AS, Sandnes (NO)

( * ) Notice: Subject to any disclaimer, the term of this patent is extended or adjusted under 35 U.S.C. 154(b) by 0 days.

(21) Appl. No.: 14/648,301

(22) PCT Filed: Dec. 13, 2013

(86) PCT No.: PCT/NO2013/050221
§ 371 (c)(1),
(2) Date: May 29, 2015

(87) PCT Pub. No.: WO2014/092583
PCT Pub. Date: Jun. 19, 2014

(65) Prior Publication Data
US 2015/0295345 A1    Oct. 15, 2015

(30) Foreign Application Priority Data

Dec. 14, 2012   (NO) .................................. 20121513

(51) Int. Cl.
*H01R 13/523* (2006.01)
*H01F 38/14* (2006.01)
(Continued)

(52) U.S. Cl.
CPC .............. *H01R 13/523* (2013.01); *H01F 38/14* (2013.01); *H01R 13/6691* (2013.01); *H02J 5/005* (2013.01)

(58) Field of Classification Search
CPC ..... H01F 38/14; H02J 5/005; H01R 13/6691; H01R 13/523

USPC ........ 439/587, 620.21, 8, 277, 320, 345, 350, 439/352, 191, 372; 200/50.03
See application file for complete search history.

(56) References Cited

U.S. PATENT DOCUMENTS

| | | | |
|---|---|---|---|
| 3,743,989 A | 7/1973 | Nicolas et al. | |
| 4,597,620 A * | 7/1986 | Lindner | H01R 13/5219 29/869 |

(Continued)

FOREIGN PATENT DOCUMENTS

| | | |
|---|---|---|
| AU | 2006100304 A4 | 5/2006 |
| CN | 101667778 A | 3/2010 |

(Continued)

OTHER PUBLICATIONS

International Sear Report for PCT/NO2013/050221 dated Mar. 28, 2014.

(Continued)

*Primary Examiner* — Edwin A. Leon
(74) *Attorney, Agent, or Firm* — Andrus Intellectual Property Law, LLP

(57) ABSTRACT

A connector is for the inductive transmission of electrical energy. The connector includes a female part and a male part. The female part and the male part each are provided with an electrical circuit, the electrical circuit forming either a primary side or a secondary side of a transformer. The female part includes a spherical cavity and a surface layer and the male part includes a spherical portion and a surface layer. The spherical cavity is complementary to the spherical portion. The electrical circuit of the female part is formed with a concave side on the side facing the surface layer of the female part, and the electrical circuit of the male part is positioned in the spherical portion of the male part. The electrical circuit is formed with a convex side on the side facing the surface layer of the male part.

7 Claims, 2 Drawing Sheets

(51) Int. Cl.
*H01R 13/66* (2006.01)
*H02J 5/00* (2016.01)

(56) References Cited

U.S. PATENT DOCUMENTS

| | | | |
|---|---|---|---|
| 4,838,797 A | 6/1989 | Dodier | |
| 6,439,906 B1* | 8/2002 | Gray | H01R 24/46 439/188 |
| 6,559,383 B1* | 5/2003 | Martin | H01R 35/04 174/21 C |
| 2014/0094051 A1* | 4/2014 | Mckay | H01R 13/523 439/345 |

FOREIGN PATENT DOCUMENTS

| | | |
|---|---|---|
| CN | 202550219 U | 11/2012 |
| DE | 19621003 A1 | 11/1997 |
| GB | 2404094 A | 1/2005 |
| JP | 05236663 A | 9/1993 |
| JP | 2002305121 A | 10/2002 |
| WO | 2005106902 A1 | 11/2005 |

OTHER PUBLICATIONS

International Preliminary Report on Patentability for PCT/NO2013/050221 dated Dec. 4, 2014.
Written Opinion for for PCT/NO2013/050221 dated Mar. 27, 2014.

* cited by examiner

DEVICE FOR INDUCTIVE TRANSMISSION OF ELECTRICAL ENERGY

CROSS-REFERENCE TO RELATED APPLICATIONS

This application is the U.S. national stage application of International Application PCT/NO2013/050221, filed Dec. 13, 2013, which international application was published on Jun. 19, 2014, as International Publication WO2014/092583 in the English language. The international application is incorporated herein by reference, in entirety. The international application claims priority to Norwegian Patent Application No. 20121513, filed Dec. 14, 2012, which is incorporated herein by reference, in entirety.

FIELD

The invention relates to a connector for the inductive transmission of electrical energy. More particularly, the invention relates to a connector with a female part and a male part, the female part and the male part being arranged to transmit more electrical energy than other such connectors of the same diameter. The connector is used with particular advantage in underwater operations.

BACKGROUND

The inductive transmission of electrical energy is known within the art. A connector for the inductive transmission of energy is a non-galvanic connector. In its simplest form, a connector for the inductive energy transmission consists of a transformer in which a primary side sits in one half of the connector and a secondary side sits in the other half of the connector. A short distance between the primary side and the secondary side gives little loss of energy, whereas the energy loss increases with increasing distance between the primary side and the secondary side. The patent publication WO2005/106902 discloses a device for such an inductive transmission of electrical energy. According to this patent publication, a power source connected to a resonant circuit is frequency-regulated. It is also known that communication signals may be transmitted in the same way.

The inductive transmission of electrical energy is known for charging electric toothbrushes, among other things. The patent publication JP H05236663 discloses a toothbrush with a secondary coil which is positioned in a rounded end portion. The toothbrush is charged by the toothbrush being placed in a holder which supports the toothbrush in such a way that the toothbrush is held in a vertically oriented position. The holder is provided with a spherical recess for the end portion of the toothbrush. A primary coil is positioned underneath the spherical recess. The patent publication CN 202550219 discloses a connector for the inductive transmission of energy and "wireless local area network" (WLAN) data. The connector can be used under water. The connector includes a male part and a complementary female part. The male part is formed as a truncated cone. The patent publication DE 19621003 discloses a plug connector for the inductive transmission of energy and signals. The plug connector includes a male part and a complementary female part. The male part is formed as a cylinder with an end portion formed as a truncated cone. The male part includes a core consisting of sintered ferrite. A primary coil is wound around a portion of the core. The female part includes a sleeve formed out of an injection-moulded plastic-bonded ferrite material. A secondary coil is wound around a portion of the sleeve. The patent publication U.S. Pat. No. 3,743,989 discloses a plug connection for the inductive transmission of energy and signals. The plug connection includes a male part and a complementary female part. The shape of the male part includes a short cylinder and a following long portion which is formed as a truncated cone. The plug connection is suitable for use in sea water. Surfaces that will come into contact with the sea water are covered with a coating that includes neoprene with an added anti-fouling agent. This gives protection against corrosion and fouling.

The inductive transmission of energy and signals is particularly advantageous in sea water as sea water has good electrical conducting properties. In the petroleum industry, it is known to use remote-operated underwater vehicles, so-called ROVs. Further, it is known that ROVs may manipulate connectors for inductive energy transmission under water by moving a male part into a female part or a female part onto a male part.

A drawback of using inductive energy transmission is that it is a limited amount of energy that may be transmitted. The amount of energy that may be transmitted is dependent on the area between the primary side and the secondary side, among other things. A drawback of known connectors for inductive energy transmission that are to be operated by an ROV is that it is difficult for an ROV operator to make the male part hit and connect to the female part, or the female part hit and connect to the male part. ROVs are affected by water currents, and the ROV has an inert mass that may make it difficult to manoeuvre with the precision required.

SUMMARY

The invention has for its object to remedy or reduce at least one of the drawbacks of the prior art or at least provide a useful alternative to the prior art.

The object is achieved through features which are specified in the description below and in the claims that follow.

The invention relates to a connector for the inductive transmission of electrical energy, the connector including a female part and a male part; the female part and the male part each being provided with an electrical circuit, the electrical circuit forming either a primary side or a secondary side of a transformer; the female part including a spherical cavity and a surface layer and the male part including a spherical portion and a surface layer; the spherical cavity being complementary to the spherical portion, and the electrical circuit of the female part being formed with a concave side on the side facing the surface layer of the female part, and the electrical circuit of the male part being positioned in the spherical portion of the male part and the electrical circuit being formed with a convex side on the side facing the surface layer of the male part.

The surface layer of the female part may be provided with channels, the channels extending along the periphery of the cavity from an inner portion of the spherical cavity to an entrance portion of the spherical cavity, and the channels having mouth portions at the entrance portion of the spherical cavity.

The male part and the female part may each be provided with an antenna for radio communication. The male part may be provided with an electronics chamber arranged to substantially maintain a pressure of 1 atm. The female part may be provided with an electronics chamber arranged to substantially maintain a pressure of 1 atm. The female part may be provided with a sealing membrane on the inside of the surface layer. The male part may be provided with a sealing membrane on the inside of the surface layer.

BRIEF DESCRIPTION OF THE DRAWINGS

In what follows, an example of a preferred embodiment is described, which is visualized in the accompanying drawings in which.

DETAILED DESCRIPTION OF THE DRAWINGS

Figure 1:
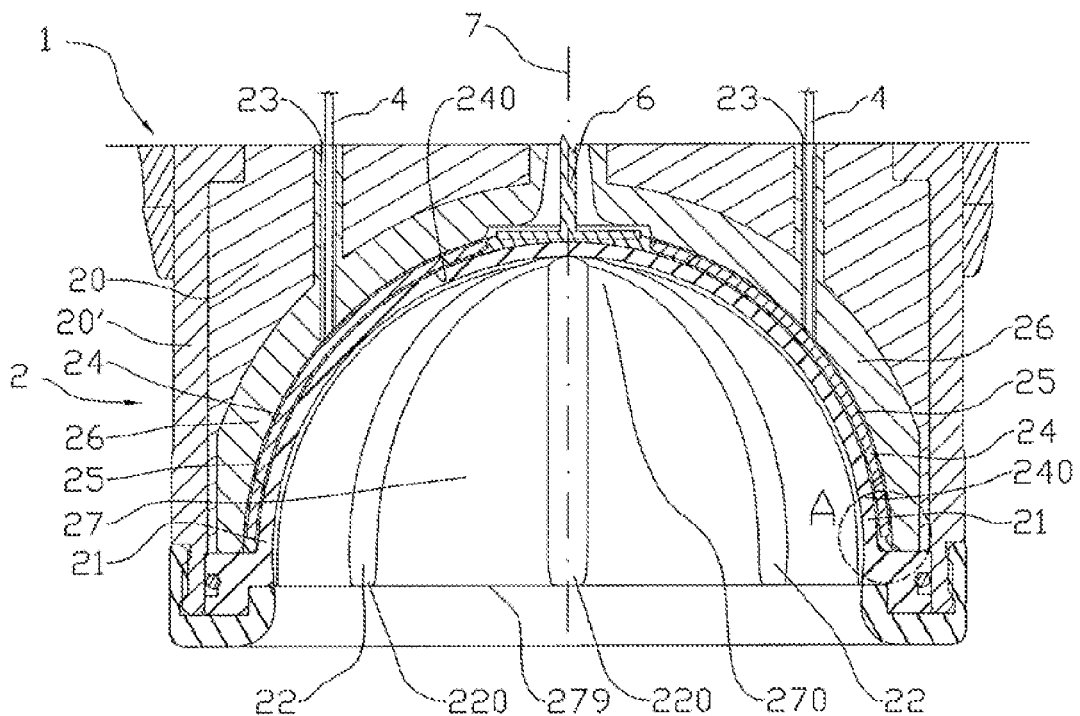
FIG. 1 shows a section of a female part for a connector for the inductive transmission of electrical energy in accordance with the invention.
Figure 2:
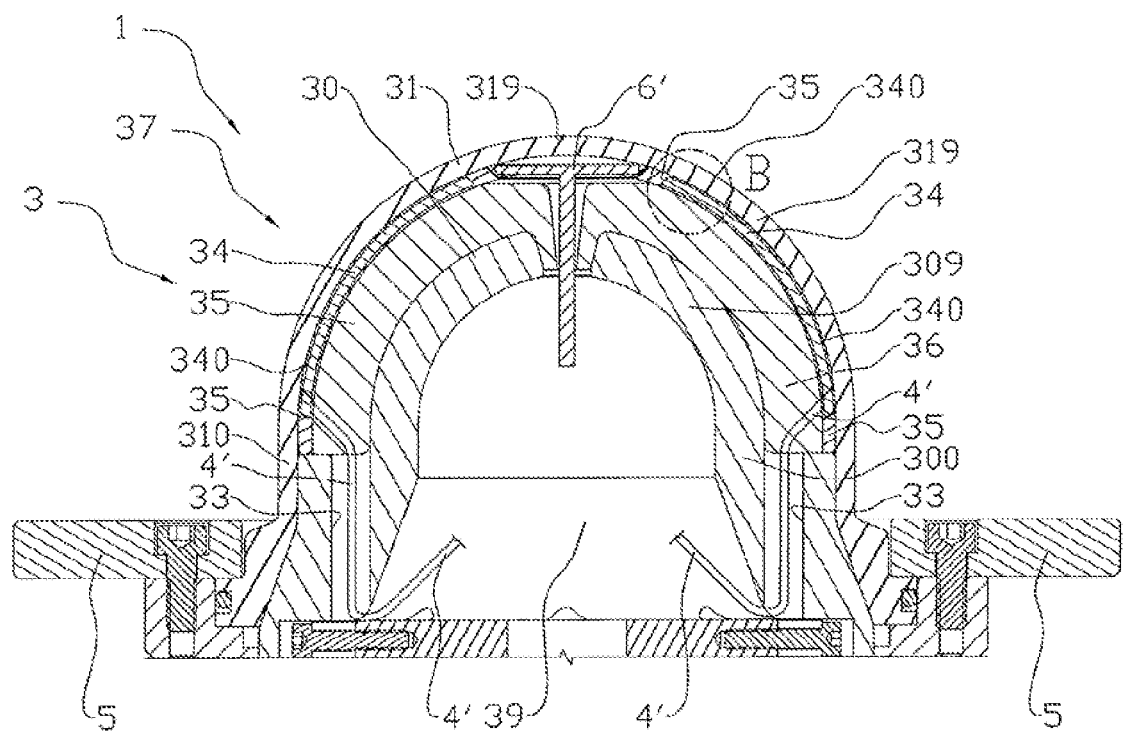
FIG. 2 shows a section, on the same scale as FIG. 1, of a mate part of a connector for the inductive transmission of electrical energy in accordance with the invention.
Figure 3:
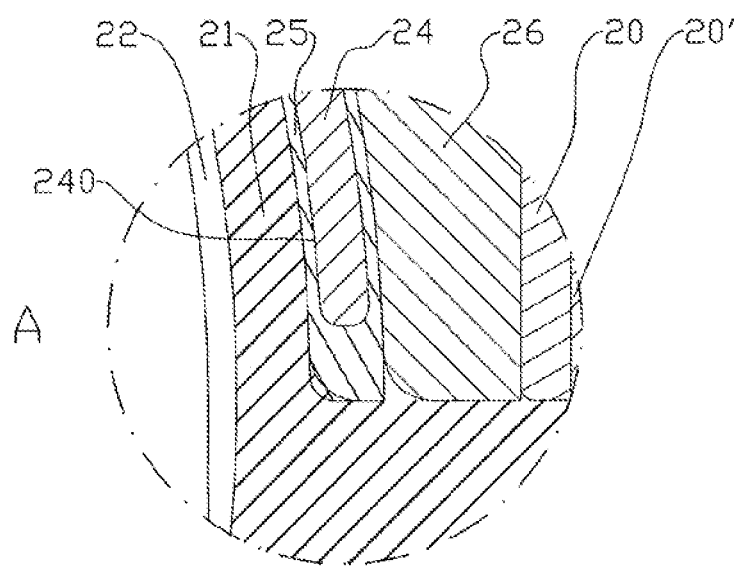
FIG. 3 shows a detail A of FIG. 1 on a larger scale.
Figure 4:
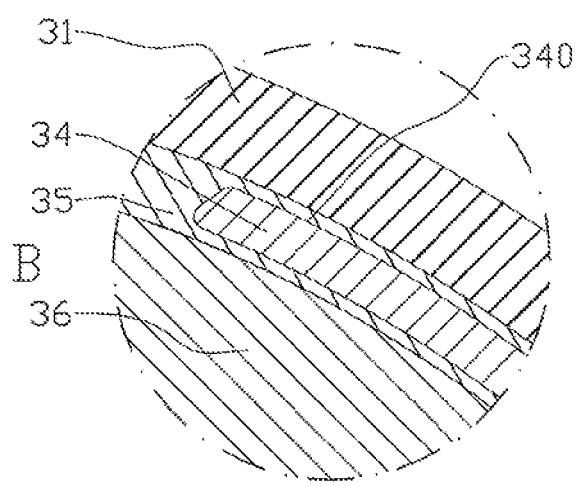
FIG. 4 shows a detail B of FIG. 2 on the same scale as FIG. 3.

In the drawings, the reference numeral 1 indicates a connector for the inductive transmission of electrical energy. The connector 1 is composed of a female part 2 and a male part 3. Only parts that are important for the understanding of the operation of the invention are mentioned.

The female part 2 comprises an inner housing 20 and an outer housing 20' enclosing the inner housing 20. At one end portion, the inner housing 20 is formed with a concave or spherical cavity 27 which is arranged to accommodate a spherical portion 37 of the male part 3. The inner housing 20 may consist of a metal or a polymer, or a combination of a metal and a polymer. The inner housing 20 forms a pressure barrier. The outer housing 20' may consist of a metal or a polymer, or a combination of a metal and a polymer.

The cavity 27 is bounded towards the surroundings by a surface layer 21. The surface layer 21 may consist of a polymer. In the surface layer 21, channels 22 are shown. The channels 22 extend along the periphery of the spherical cavity 27, from an inner portion 270 of the spherical cavity 27 to an entrance portion 279 of the spherical cavity 27. The channels 22 have mouth portions 220 at the entrance portion 279 of the spherical cavity 27. The purpose of these channels 22 is described in what follows. Within the surface layer 21, a sealing membrane (not shown) may have been positioned. The sealing membrane may enclose the inside of the surface layer 21. Facing the surface layer 21, an electrical circuit 24 constituting a primary side or a secondary side of a transformer has been formed. The electrical circuit 24 is shown embedded in a polymer-containing mass 25. The polymer-containing mass 25 may comprise an epoxy mass 25. The space between the polymer-containing mass 25 and the housing 20 is filled up with a ferrite-containing mass 26. A plurality of channels 23 extend through the inner housing 20 to the polymer-containing mass 25 with the electrical circuit 24. Wires 4 extend from the electronics chamber (not shown) of the female part 2, through the housing 20 to the electrical circuit 24 through one or more of the channels 23.

The male part 3 includes a pressure barrier 30. In one portion, the pressure barrier 30 is formed with a convexly protruding spherical portion 309. In addition, the pressure barrier 30 is shown with a cylindrical portion 300 within the protruding spherical portion 309. The pressure barrier 30 may consist of a metal or a polymer, or a combination of a metal and a polymer. The pressure barrier 30 surrounds an electronics chamber 39.

In a portion, the male part 3 is bounded towards the surroundings by a surface layer 31. The surface layer 31 is shown with a spherical portion 319 and a cylindrical portion 310. The surface layer 31 may consist of a polymer. A sealing membrane (not shown) may be positioned within the surface layer 31. The sealing membrane may enclose the inside of the surface layer 31.

Within the surface layer 31, an electrical circuit 34 has been formed, constituting a primary side or a secondary side of a transformer. The electrical circuit 34 is shown embedded in a polymer-containing mass 35. The polymer-containing mass 35 may comprise an epoxy mass 35. The space between the polymer-containing mass 35 and the pressure barrier 30 is filled up with a ferrite-containing mass 36. Wires 4' extend from the electronics chamber 39 of the male part 3 to the electrical circuit 34 through channels 33. The male part 3 is further provided with one or more flanges 5.

In the figures, an antenna 6 in the female part 3 and an antenna 6' in the male part 3 are shown as well. The antenna 6 extends towards the inner portion 270 of the spherical cavity 27. The antenna 6' extends towards the top portion 319 of the male part 3. The antennas 6, 6' enable radio communication between the female part 2 and the male part 3.

The electrical circuit 24 of the female part 2 is formed with a concave side 240 facing the surface layer 21 and the spherical cavity 27. The electrical circuit 34 of the male part 3 is formed with a convex side 340 facing the surface layer 31 and the spherical portion 37. A short and constant distance between the electrical circuit 24 and the electrical circuit 34 along the concave side 240 and the convex side 340 is thereby achieved. By a concave side is meant, in this description, that the side forms a portion of an internal ball surface. By a convex side is meant, in this description, that the side forms a portion of an external ball surface. The internal ball surface and the external ball surface may deviate from a perfect ball surface in which each point has the same radius to the centre of the imaginary ball.

The necessary electronics and electrical circuits are positioned in the electronics chamber (not shown) of the female part 2 and in the electronics chamber 39 of the male part. The electronics chamber of the female part 2 and the electronics chamber 39 of the male part 3 may be kept at a pressure which is substantially the atmospheric pressure as the inner housing 20 of the female part 2 forms a pressure barrier and the male part 3 includes the pressure barrier 30.

The surface layer 31 of the male part 3 is further formed with a spherical shape. This has the advantage of enabling the male part 3 to hit the female part 2 at an angle that deviates from the longitudinal axis 7 of the female part 2. Still, the shapes of the male part 3 and female part 2 will result in the male part 3 and the female part 2 being brought together completely as they are pressed towards each other. This facilitates the joining of the female part 2 and the male part 3 by the use of an ROV. Water present in the cavity 27 of the female part 2 will be squeezed out as the male part 3 is inserted. This gives a self-cleaning effect as any particulate material that may have settled on the surface layer 21 of the cavity 27 will be whirled up and carried away. The channels 22 increase the self-cleaning effect.

In an alternative embodiment (not shown), the surface layer 31 of the male part 3 is provided with channels. The channels may extend across the spherical portion 319 and end at the cylindrical portion 310.

The spherical portion 37 gives a larger surface than a corresponding flat portion of the same diameter. This has the advantage of a larger area being available for the electrical circuit 24 and the electrical circuit 34. Greater power may thereby be transmitted than that in known solutions of the same diameter.

The spherical shape enables the pressure barrier 30 to withstand greater pressures with the same thickness of material, or the thickness of material to be reduced in order to resist the same pressures, as other known designs. This is advantageous as part of the electronics and the electrical components that are necessary for the operation of the inductive connector will have to be protected from both water and pressure.

The invention claimed is:

1. A connector for the inductive transmission of electrical energy, the connector comprising:
 a female part and a male part; the female part and the male part each being provided with an electrical circuit, the electrical circuit forming either a primary side or a secondary side of a transformer; the female part including a spherical cavity and a surface layer and the male part including a spherical portion and a spherical surface layer; the spherical cavity being complementary to and arranged to accommodate the spherical portion,
 wherein the electrical circuit of the female part is formed with a concave side on the side facing the surface layer of the female part, and the electrical circuit of the male part is positioned in the spherical portion of the male part and the electrical circuit is formed with a convex side on the side facing the surface layer of the male part,
 the electrical circuits along the concave side and the convex side being configured to provide a short constant distance and an area therebetween to reduce loss of electrical energy and improve electrical energy transmission.

2. The connector in accordance with claim 1, wherein the surface layer of the female part is provided with channels, the channels extending along the periphery of the spherical cavity from an inner portion of the spherical cavity to an entrance portion of the spherical cavity, and the channels having mouth portions at the entrance portion of the spherical cavity.

3. The connector in accordance with claim 1, wherein the female part and the male part are each provided with an antenna for radio communication.

4. The connector in accordance with claim 1, wherein the male part is provided with an electronics chamber arranged to substantially maintain a pressure of 1 atm.

5. The connector in accordance with claim 1, wherein the female part is provided with a sealing membrane on the inside of the surface layer.

6. The connector in accordance with claim 1, wherein the male part is provided with a sealing membrane on the inside of the surface layer.

7. A connector for the inductive transmission of electrical energy, the connector comprising:
 a female part and a male part; the female part and the male part each being provided with an electrical circuit, the electrical circuit forming either a primary side or a secondary side of a transformer; the female part including a spherical cavity and a surface layer and the male part including a spherical portion and a spherical surface layer; the spherical cavity being complementary to the spherical portion,
 wherein the electrical circuit of the female part is formed with a concave side on the side facing the surface layer of the female part, and the electrical circuit of the male part is positioned in the spherical portion of the male part and the electrical circuit is formed with a convex side on the side facing the surface layer of the male part, and
 wherein the surface layer of the female part is provided with channels, the channels extending along the periphery of the spherical cavity from an inner portion of the spherical cavity to an entrance portion of the spherical cavity, and the channels having mouth portions at the entrance portion of the spherical cavity.

* * * * *